United States Patent [19]

Foley

[11] 4,255,857

[45] Mar. 17, 1981

[54] SELECTIVE CONDUCTOR SEVERING TOOL

[75] Inventor: Robert G. Foley, Redondo Beach, Calif.

[73] Assignee: Thomas & Betts Corporation, Raritan, N.J.

[21] Appl. No.: 83,814

[22] Filed: Oct. 11, 1979

[51] Int. Cl.³ .............................................. B26F 1/00
[52] U.S. Cl. ......................................... 30/363; 30/229
[58] Field of Search ........................ 30/363, 368, 229

[56] References Cited

U.S. PATENT DOCUMENTS

| | | | |
|---|---|---|---|
| 1,229,213 | 6/1917 | Bernard | 30/363 |
| 1,450,795 | 4/1923 | Dohe | 30/363 X |
| 1,785,215 | 12/1930 | Sponable | 30/363 |
| 1,804,648 | 5/1931 | Scribner | 30/363 |
| 2,624,940 | 1/1953 | Osborne | 30/363 X |
| 2,690,009 | 9/1954 | Welk | 30/229 |
| 2,742,696 | 4/1956 | Williams | 30/229 X |
| 3,505,714 | 4/1970 | Boileau | 30/363 |
| 4,050,154 | 9/1977 | Oetiker | 30/363 |
| 4,177,664 | 12/1979 | Spors | 30/229 |

*Primary Examiner*—Jimmy C. Peters
*Attorney, Agent, or Firm*—James J. Daley; Robert M. Rodrick; Jesse Woldman

[57] ABSTRACT

A tool for the selective severing of a conductor in a multi-conductor flat cable and preforming the remaining free end comprising a punch means with a first conductor relief slot and a die means with a second conductor relief slot such that when the die and punch means are applied to a conductor it is severed and the free end trapped between the first and second conductor relief slots. Guides on the tool and die means permit alignment of the tool with a selected conductor while grooves on the die means prevent unwanted cable movement.

13 Claims, 9 Drawing Figures

SELECTIVE CONDUCTOR SEVERING TOOL

BACKGROUND OF THE INVENTION

1. Field of the Invention

The invention pertains to the selective severing of at least one conductor of a multi-conductor flat cable and preforming the resulting free end.

2. Description of the Prior Art

Prior art techniques for the selective severing of a single conductor of a multi-conductor flat cable involve the use of side cutters carefully applied by a technician to the desired conductor. However, because of the small size of the conductors and the large size of the side cutters it is not unusual to cut two or three conductors or to injure the insulation of the conductors adjacent the one to be cut.

SUMMARY OF THE INVENTION

The present invention overcomes the unreliable manual techniques found in the prior art by providing a simple hand tool to permit the accurate severing of the selected conductor and the performing of the resulting free end. The tool is made up of a punch with a first conductor relief slot and a die with a second conductor relief slot. When brought together on the selected conductor it is severed and the free end extended into the first and second conductor relief slots preforming it. Guides on the tool jaw and die permit the tool to be aligned with the selected conductor while a groove pattern, such as that of the cable, on the die, acts to prevent the cable from shifting during severing. Finally, a guide pin limits the intrusion of the cable into the tool.

It is an object of this invention to provide a selectively operable conductor severing and forming tool.

It is an object of this invention to provide a die means and a punch means with conductor relief slots.

It is another object of this invention to provide die means and punch means to selectively sever a conductor and preform the free end.

It is another object of this invention to provide a tool for the selective severing of a conductor with guide means to align the tool with the conductor.

It is another object of the invention to provide a tool for the selective severing of a conductor with retaining grooves to prevent the shifting of the conductor during severing.

Other objects and features of the invention will be pointed out in the following description and claims and illustrated in the accompanying drawings, which disclose, by way of example, the prinicple of the invention, and the best mode which has been contemplated for carrying it out.

BRIEF DESCRIPTION OF THE DRAWINGS

In the drawings in which similar elements are given similar reference characters.

DESCRIPTION OF THE PREFERRED EMBODIMENT

Figure 9:
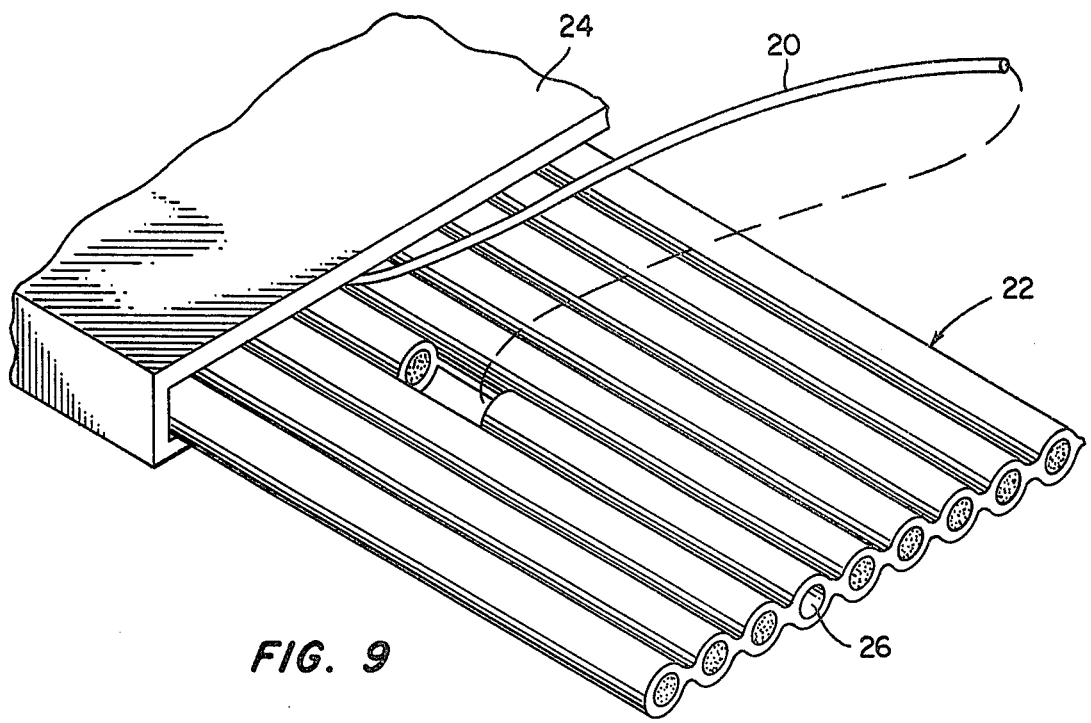
FIG. 9 is a front perspective view of a multi-conductor flat cable as it will be used after removal of the severed conductor.

The tool of the instant invention finds utility where it is desired to terminate a drain or ground wire 20 (see FIG. 9) of a flat conductor cable 22 within the contours of the flat conductor cable 22 itself. As is evident from FIG. 9, the drain wire 20 is separate from flat conductor cable 22 although both are in protective jacket 24. To be able to terminate the drain wire 20 in the same connector (not shown) as the flat conductor cable 22 it is necessary that the drain wire 20 be placed in one of the cable positions 26. The cable position 26 will depend upon the wiring of the connector so it is necessary that the correct cable position 26 be chosen. The tool of the present invention permits the installer to pick the desired cable position 26, sever a selected condutor of the flat conductor cable 22, remove the severed conductor from the cable insulation and at the desired cable position 26 insert the drain wire 20 so that it can be mass-terminated along with the remaining conductors of flat conductor cable 22.

Turning now to FIGS. 1 to 7 a selective conductor severing tool 30 constructed in accordance with the concepts of the invention is shown. Tool 30 has a first handle 32 and a second handle 34 pivotally coupled as at 36 for movement towards and away from each other. Coupled to first handle 32 is a first jaw 38 and similarily coupled to second handle 34 is a second jaw 40.

Figure 1:
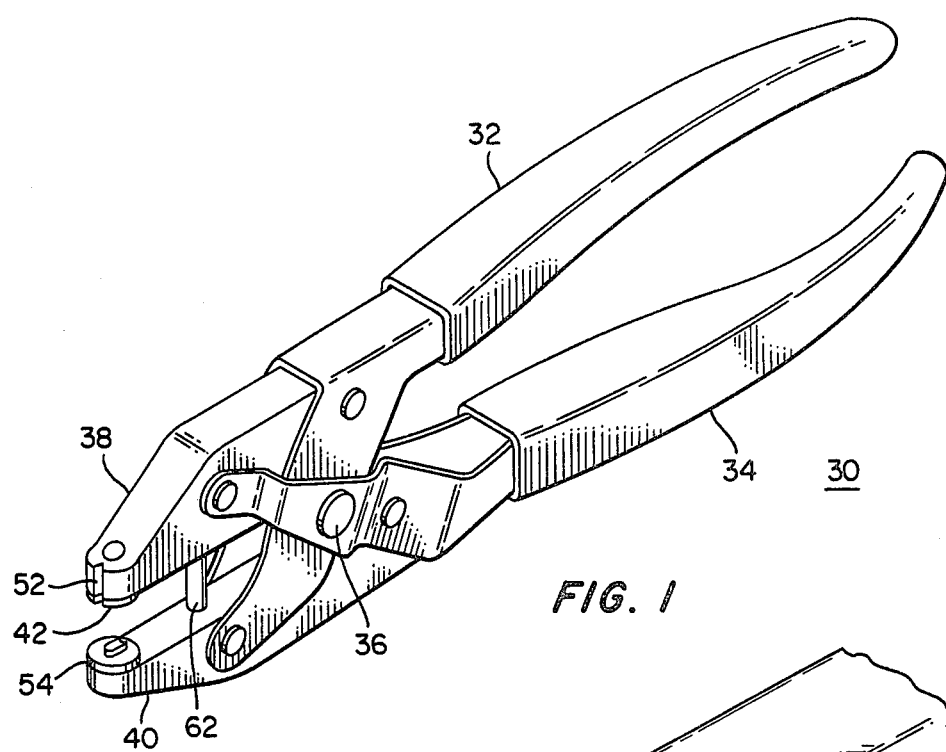
FIG. 1 is a front perspective view of a tool constructed in accordance with the principles of the inventions.
Figure 2:
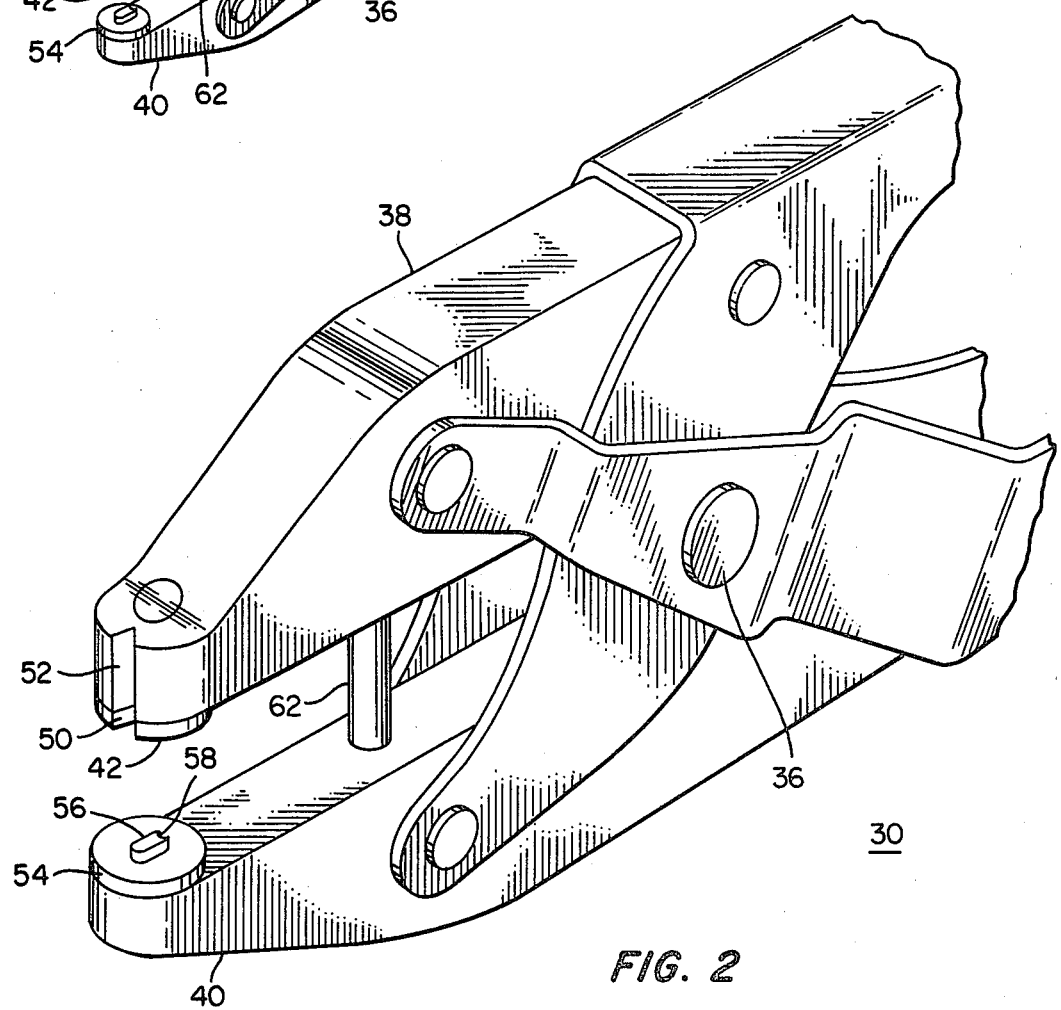
FIG. 2 is an enlarged fragmented front perspective view of the jaws of the tool of FIG. 1.
Figure 3:
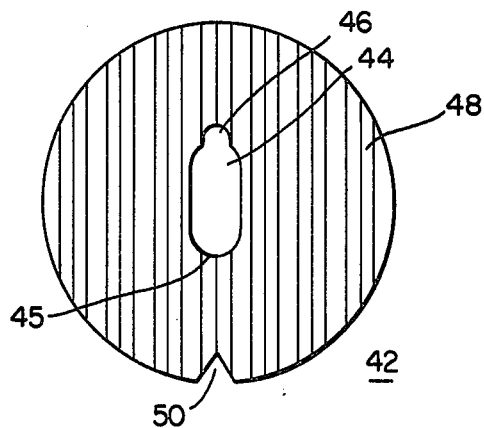
FIG. 3 is a bottom plan view of the die means of the tool of FIG. 1.
Figure 7:
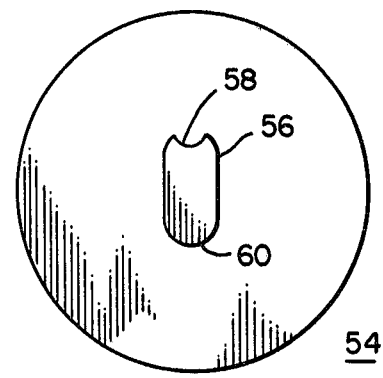
FIG. 7 is a top plan view of the punch means of FIG. 6.
Figure 5:
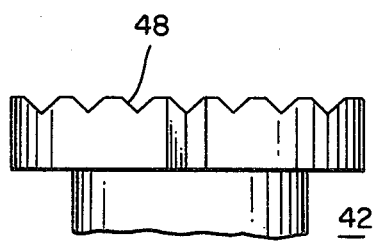
FIG. 5 is a front elevation, partly fragmented, of the die means of FIG. 3.
Figure 6:
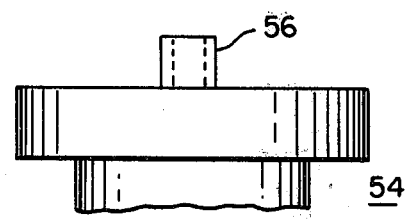
FIG. 6 is a front elevation, partly fragmented, of the punch means of the tool of FIG. 1.
Figure 4:
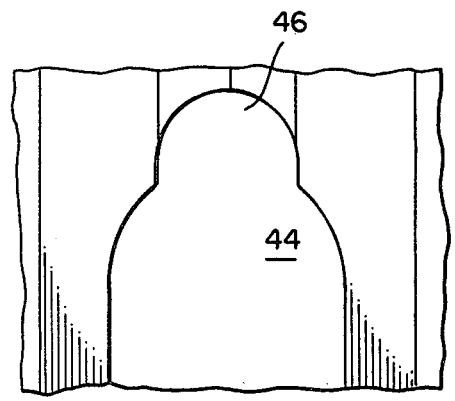
FIG. 4 is a fragmentary enlarged portion of the die means of FIG. 3.

Jaw 38 carries a die support 42, as best seen in FIG. 3. In the die support 42 is formed an elongated die nest 44 terminating in a conductor relief slot 46. The conductor relief slot 46 (see FIG. 4) goes beyond the contour of the die nest 44 and, as will be evident below, cooperates with a similar slot in the punch member to protect the free end of a severed conductor and preform it so that it can readily be removed. The die supports 42 (see FIG. 5) also carries a series of alignment slots 48 into which the conductors of the flat conductor cable 22 can fit so as to prevent relative movement of such flat conductor cable 22 during conductor severing. A notch 50 extends in the die support 42 end face to permit alignment of the tool 30 with the desired conductor. Jaw member 38 further includes a notch 52 to be aligned with notch 50 of the die support 42 (see FIG. 2) to facilitate the alignment of tool 30 with a conductor to be severed.

Figure 8:
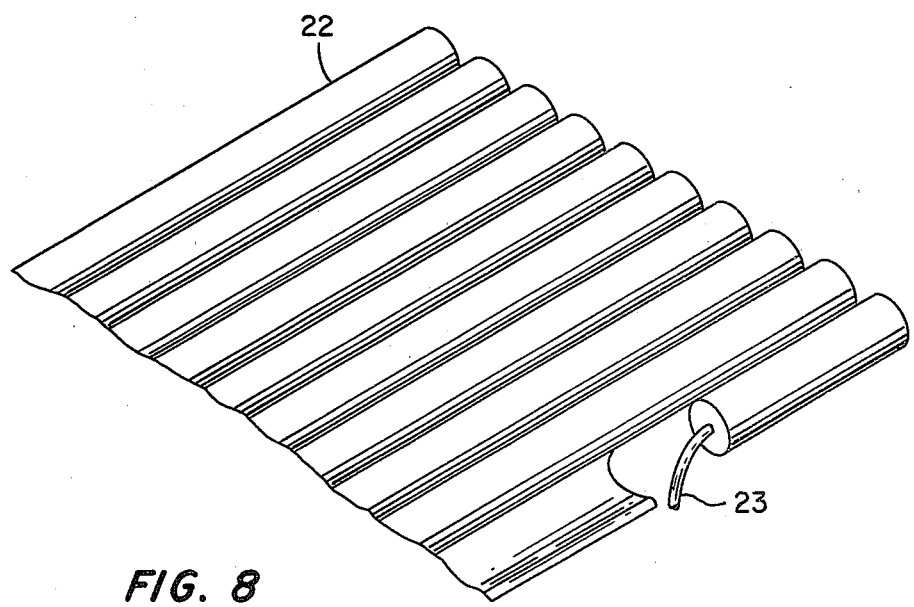
FIG. 8 is an fragmentary front perspective view of the cable showing the resulting shape of the severed conductor.

Jaw member 40 carries a punch support 54 which in turn (see FIGS. 6 and 7) carries an elongated punch 56 having a conductor relief slot 58 therein. When the edge 60 of punch 56 and edge 45 of the die nest 44 meet, the conductor is severed and the free end is guided between the conductor relief slot 46 of die nest 44 and conductor relief slot 58 of the punch 56 and preformed as at 23, as shown in FIG. 8. The metal conductor can now be easily removed from the end portion of the flat conductor cable 22 by grasping the turned-up portion 23 and pulling the conductor out of the area opened by severing the conductor. A guide pin 62 extends between jaws 38 and 40 to limit the insertion of a flat conductor cable 22 into tool 30.

While there have been shown and described and pointed out the fundamental novel features of the invention as applied to the preferred embodiment, it will be understood that various omissions and substitutions and changes of the form and details of the device illustrated and in its operation may be made by those skilled in the art, without departing from the spirit of the invention.

The embodiments of the invention in which an exclusive property or privilege is claimed are defined as follows:

1. A tool for selectively severing at least one conductor of a multi-conductor flat cable comprising: punch means having a first conductor relief slot; and die means having a main portion to accept said punch means therein and a second conductor relief slot therein whereby when said punch means and said die means are closed upon a selected conductor of a multi-conductor flat cable, a portion of such conductor is severed by said punch means and said die means and the free end of such conductor is captured between said first and said second conductor relief slots.

2. A tool as defined in claim 1 further comprising guide means for aligning said punch means and said die means with a selected conductor.

3. A tool as defined in claim 1 wherein said die means includes a guide means for aligning said punch means and said die means with a selected conductor.

4. A tool as defined in claim 1 further comprising first guide means and said die means includes a second guide means, said first and said second guide means aligning said punch means and said die means with a selected conductor.

5. A tool as defined in claim 1 wherein said die means is grooved to accept a portion of a multi-conductor flat cable and prevent same from moving with respect to said die means as said die means and punch means are made to engage a selected conductor.

6. A tool as defined in claim 3 wherein said die means is grooved to accept a portion of a multi-conductor flat cable and prevent same from moving with respect to said die means as said die means and punch means are made to engage a selected conductor.

7. A tool for selectively severing at least one conductor of a multi-conductor flat cable comprising first and second handle means; first and second jaw means coupled to said first and second handle means respectively; connecting means coupled to said first and second handle means to permit said first and second handle means to be moved toward and away from each other, said first and said second jaw means moving in a similar manner; a punch means on said first jaw means, said punch means having a first conductor relief slot thereon; die means on said second jaw means, said die means having a main portion to accept said punch means therein and a second conductor relief slot therein; whereby when said first and second jaw means are closed upon a selected conductor of a multi-conductor flat cable, a portion of such conductor is severed by said punch means and said die means and the free end of such conductor is captured between said first and second conductor relief slots.

8. A tool as defined in claim 7 further comprising guide means for aligning said punch means and said die means with a selected conductor.

9. A tool as defined in claim 7 wherein said die means includes a guide means for aligning said punch means and said die means with a selected conductor.

10. A tool as defined in claim 1 further comprising first guide means and said die means includes a second guide means, said first and second guide means aligning said punch means and said die means with a selected conductor.

11. A tool as defined in claim 7 wherein said die means is grooved to accept a portion of a multi-conductor flat cable and prevent same from moving with respect to said die means as said die means and punch means are made to engage a selected conductor.

12. A tool as defined in claim 9 wherein said die means is grooved to accept a portion of a multi-conductor flat cable and prevent same from moving with respect to said die means as said die means and punch means are made to engage a selected conductor.

13. A tool as defined in claim 7 further including a guide pin between said first and second jaw means to limit the insertion of a multi-conductor flat cable into said tool.

* * * * *